United States Patent
Tsubaki et al.

(10) Patent No.: US 12,084,059 B2
(45) Date of Patent: Sep. 10, 2024

(54) CONTROL METHOD FOR VEHICLE AND VEHICLE

(71) Applicant: NISSAN MOTOR CO., LTD., Yokohama (JP)

(72) Inventors: Kenichi Tsubaki, Yokohama (JP); Qingyang Wu, Yokohama (JP); Ken Yamada, Yokohama (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/347,885

(22) Filed: Jul. 6, 2023

(65) Prior Publication Data
US 2024/0025413 A1   Jan. 25, 2024

(30) Foreign Application Priority Data
Jul. 21, 2022   (JP) ................................ 2022-116596

(51) Int. Cl.
*B60W 30/19* (2012.01)
*B60W 10/06* (2006.01)
(Continued)

(52) U.S. Cl.
CPC .......... *B60W 30/192* (2013.01); *B60W 10/06* (2013.01); *B60W 10/184* (2013.01);
(Continued)

(58) Field of Classification Search
CPC .... B60W 10/06; B60W 10/184; B60W 30/19; B60W 30/192; B60W 30/18018;
(Continued)

(56) References Cited

U.S. PATENT DOCUMENTS 6,093,974 A * 7/2000 Tabata ............... B60W 30/1819
                                                  903/910
6,258,008 B1 * 7/2001 Tabata ..................... B60K 6/48
                                                  903/910
(Continued)

FOREIGN PATENT DOCUMENTS

JP        2000 313253 A  *  3/1999
JP        2012-076521 A      4/2012

*Primary Examiner* — Logan M Kraft
*Assistant Examiner* — Johnny H Hoang
(74) *Attorney, Agent, or Firm* — Foley & Lardner LLP

(57) ABSTRACT

Provided is a control method for a vehicle including an internal combustion engine as a driving source, the control method for the vehicle including: executing automatic stop control of automatically stopping the internal combustion engine when a predetermined stop condition is satisfied, and executing automatic restart control of automatically restarting the internal combustion engine when a predetermined restart condition is satisfied during execution of the automatic stop control; performing brake holding control of applying a braking force to wheels to maintain a vehicle stop state during the execution of the automatic stop control; and automatically restarting the internal combustion engine when the restart condition is satisfied, and releasing the brake holding control when a predetermined period elapses since the restart condition is satisfied. Particularly, in this control method, the predetermined period is varied according to an engine revolution speed at a time when the restart condition is satisfied.

6 Claims, 8 Drawing Sheets

(51) Int. Cl.
  *B60W 10/18* (2012.01)
  *B60W 10/184* (2012.01)
  *B60W 30/192* (2012.01)

(52) U.S. Cl.
  CPC . *B60W 2510/0638* (2013.01); *B60W 2552/15* (2020.02); *B60W 2710/0644* (2013.01); *B60W 2710/18* (2013.01)

(58) Field of Classification Search
  CPC ..... B60W 30/18019; B60W 2510/101; B60W 2510/0638; F02D 41/02; F02D 41/022; F02D 41/08; F02D 2200/0406; F02D 2200/1012; F02D 45/00; F02D 29/02; F02D 13/04; F02D 2011/102; F02N 11/08; F02N 11/084; F02N 11/0818
  USPC .................... 701/22, 54, 105, 107, 110–115; 180/65.265, 65.22, 65.28, 65.285; 803/902, 903, 930; 123/179.4, 179.24
  See application file for complete search history.

(56) References Cited

U.S. PATENT DOCUMENTS

| 2010/0174473 | A1* | 7/2010 | Pursifull | F02N 11/0844 701/112 |
| 2010/0203989 | A1* | 8/2010 | Shirasaka | F16H 61/0031 474/28 |
| 2013/0116895 | A1* | 5/2013 | Smith | F16H 61/70 701/50 |
| 2013/0179053 | A1* | 7/2013 | Matsunaga | F02D 45/00 701/112 |
| 2016/0229406 | A1* | 8/2016 | Okabe | B60W 10/10 |

* cited by examiner

CONTROL METHOD FOR VEHICLE AND VEHICLE

CROSS REFERENCE TO RELATED APPLICATIONS

This application claims priority based on Japanese Patent Application No. 2022-116596 filed to the Japan Patent Office on Jul. 21, 2022, and the entire contents of this application are incorporated herein by reference.

FIELD OF THE INVENTION

The present invention relates to a control method for a vehicle and a vehicle.

BACKGROUND OF THE INVENTION

A so-called idling stop vehicles are known, which have a function of automatically stopping an engine when a predetermined automatic stop condition is satisfied at a time of stopping, and automatically restarting the engine when a predetermined restart condition is satisfied. JP2012-076521A discloses that, when an engine is restarted under a restart condition that at least a brake pressure is less than a predetermined value, and if a brake pedal is depressed, the brake pressure is less than the predetermined value, and an engine revolution speed is equal to or higher than a predetermined revolution speed (a revolution speed at which a sufficient creep force is generated), application of a brake force is controlled to continue for a predetermined period as control of an idling stop vehicle. When the brake pedal is depressed, it is regarded that a driver does not intend to start. In addition, if the engine revolution speed is equal to or higher than the predetermined revolution speed, there is a risk that jumping-out due to the creep force generated by the engine restart may occur. That is, in the above control, in a state where the driver does not intend to start and the jumping-out may occur due to the engine restart, the application of the brake force that has been executed during idling stop is continued when the engine is restarted. By this control, it is possible to prevent a kicked feeling associated with the engine restart from being applied to the driver. In addition, in the control of the above document, when the state where the brake pedal is depressed is changed to a state where the brake pedal is not depressed during the automatic stop, the application of the brake force is not continued. This is because, since releasing the brake pedal means that the driver intends to restart the engine, it is regarded that the driver does not feel the kicked feeling, and quick engine restart and start are prioritized.

Incidentally, after an automatic stop condition is satisfied and fuel cut is performed in order to stop an engine, during a decrease of an engine revolution speed, a driver may shift depression from a brake pedal to an accelerator pedal due to a change in an intention of the driver or the like, and a restart condition may be satisfied. In this case, in the control of the above document, since the brake pedal is not depressed, it is regarded that the driver does not feel the kicked feeling, and the application of the brake force is not continued. However, an engine revolution speed at a time when the restart condition is satisfied differs from an engine revolution speed at a time when the fuel cut is performed. Therefore, a creep force larger than a creep force expected by the driver is generated depending on the engine revolution speed, and the driver may feel the kicked feeling. On the other hand, when the application of the brake force is continued for a predetermined period as in the case where the brake pedal is depressed, quick start is hindered.

BRIEF SUMMARY OF THE INVENTION

Therefore, an object of the invention is to enable quick start without giving the kicked feeling to the driver when the restart condition is satisfied due to the change in the intention of the driver or the like after the automatic stop condition is satisfied and the fuel cut is performed.

According to an aspect of the invention, there is provided a control method for a vehicle including an internal combustion engine as a driving source, the control method including: executing automatic stop control of automatically stopping the internal combustion engine when a predetermined stop condition is satisfied; executing automatic restart control of automatically restarting the internal combustion engine when a predetermined restart condition is satisfied during execution of the automatic stop control; performing brake holding control of applying a braking force to wheels to maintain a vehicle stop state during the execution of the automatic stop control; automatically restarting the internal combustion engine when the restart condition is satisfied; and releasing the brake holding control when a predetermined period elapses since the restart condition is satisfied. In the control method, the predetermined period is varied according to an engine revolution speed at a time when the restart condition is satisfied.

According to the above aspect, when the restart condition is satisfied due to a change in an intention of a driver or the like after an automatic stop condition is satisfied and fuel cut is performed, it is possible to quickly start without giving a kicked feeling to the driver.

DETAILED DESCRIPTION OF THE INVENTION

Hereinafter, an embodiment of the invention will be described with reference to the accompanying drawings.

Figure 1:
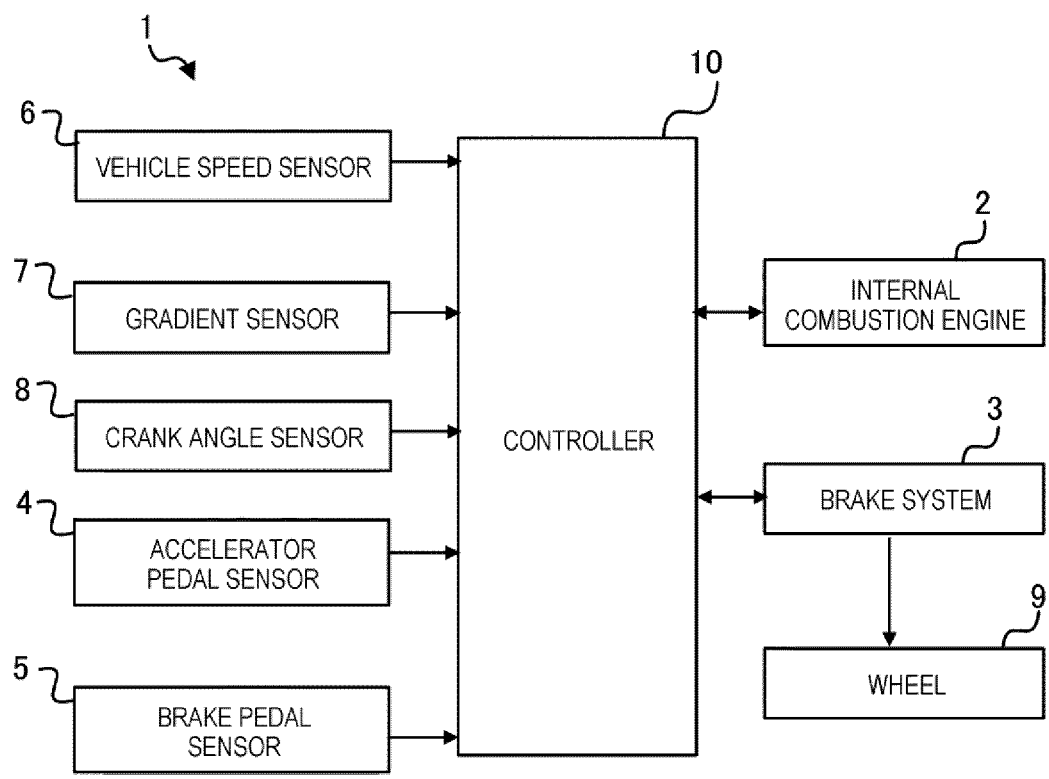
FIG. 1 is a schematic configuration diagram illustrating an example of a system configuration of a vehicle.

FIG. 1 is a schematic configuration diagram illustrating an example of a system configuration of a vehicle 1 according to the present embodiment.

The vehicle 1 includes an internal combustion engine 2 (hereinafter, also simply referred to as an "engine") as a driving source, a brake system 3 that applies a braking force to wheels 9, a controller 10 that controls the internal combustion engine 2 and the brake system 3, and sensors that acquire various pieces of information used for the control by the controller 10.

The engine 2 may be a gasoline engine or a diesel engine.

The brake system 3 has a function of applying a braking force to the wheels 9 according to a brake pedal operation of a driver, and also has a function of applying a braking force to the wheels 9 according to an instruction from the controller 10 in order to avoid a collision, prevent a sideslip, and perform other driving support even when the driver does not perform the brake pedal operation.

The controller 10 is constituted with a microcomputer including a central processing unit (CPU), a read only memory (ROM), a random-access memory (RAM), and an input/output interface (I/O interface). It is also possible to constitute the controller by a plurality of microcomputers.

The vehicle 1 includes, as the sensors, an accelerator pedal sensor 4 that detects an opening degree of an accelerator pedal (not illustrated), a brake pedal sensor 5 that detects whether the brake pedal (not illustrated) is depressed, a vehicle speed sensor 6 that detects a vehicle speed, a gradient sensor 7 that detects a gradient of a road surface at a current position, and a crank angle sensor 8 that detects a revolution speed of the engine 2. The brake pedal sensor 5 needs to be able to detect at least whether the brake pedal is depressed, and may detect a depression force of the driver. In addition to the above sensors, the vehicle 1 also includes an air flow sensor (not illustrated) that detects an intake air amount, a throttle opening degree sensor (not illustrated) that detects an opening degree of a throttle valve, and the like.

Detection values of the sensors described above are read into the controller 10 as detection signals. The controller 10 controls the engine 2 and the brake system 3 based on the detection values.

The control performed by the controller 10 includes automatic stop control and automatic restart control for the engine 2. The automatic stop control is, for example, control of automatically stopping the engine 2 when a stop condition that the brake pedal is depressed, and the vehicle speed is equal to or lower than a predetermined vehicle speed is satisfied. The automatic restart control is control of, for example, automatically restarting the engine 2 when a restart condition that the brake pedal is released or a battery capacity is equal to or less than a threshold value, or the like is satisfied in a case where the engine 2 is stopped by the automatic stop control. Since an automatic stop condition and the restart condition may be any known conditions, detailed description thereof will be omitted.

When the engine 2 is stopped by the automatic stop control and the vehicle is stopped, the controller 10 applies a braking force to the wheels 9 by the brake system 3 to execute brake holding control for maintaining a vehicle stop state. The brake holding control can suppress unintended start of the driver due to a torque generated by the automatic restart of the engine 2 when the battery capacity is equal to or less than the threshold value while the vehicle is stopped according to a stop signal, for example.

Here, the brake holding control may be a problem when the engine 2 is automatically restarted according to an intention of the driver to start.

If the brake holding control is not continued after the restart condition is satisfied, the driver may feel a kicked feeling. Here, the "kicked feeling" is a generic term of an abruptness feeling that increases as a time change rate of acceleration increases, and a sense of pressing that increases as a first peak of the acceleration increases. On the other hand, if the brake holding control is continued even after the restart condition is satisfied, for example, it is possible to suppress sliding down until the engine 2 generates the torque when the driver releases a foot from the brake pedal and the engine 2 is automatically restarted in order to start the vehicle while the vehicle is stopped on an uphill road. However, continuation of the brake holding control may hinder quick start.

Even when the brake holding control is still continued after the restart condition is satisfied, the driver may feel the kicked feeling unless a continuation time is appropriate. This is because an engine revolution speed (also referred to as a revolution speed in determination) at a time when the restart condition is satisfied varies according to situations, and when the revolution speed in determination varies, profiles of the engine revolution speed and an engine torque after the restart are different.

Figure 2:
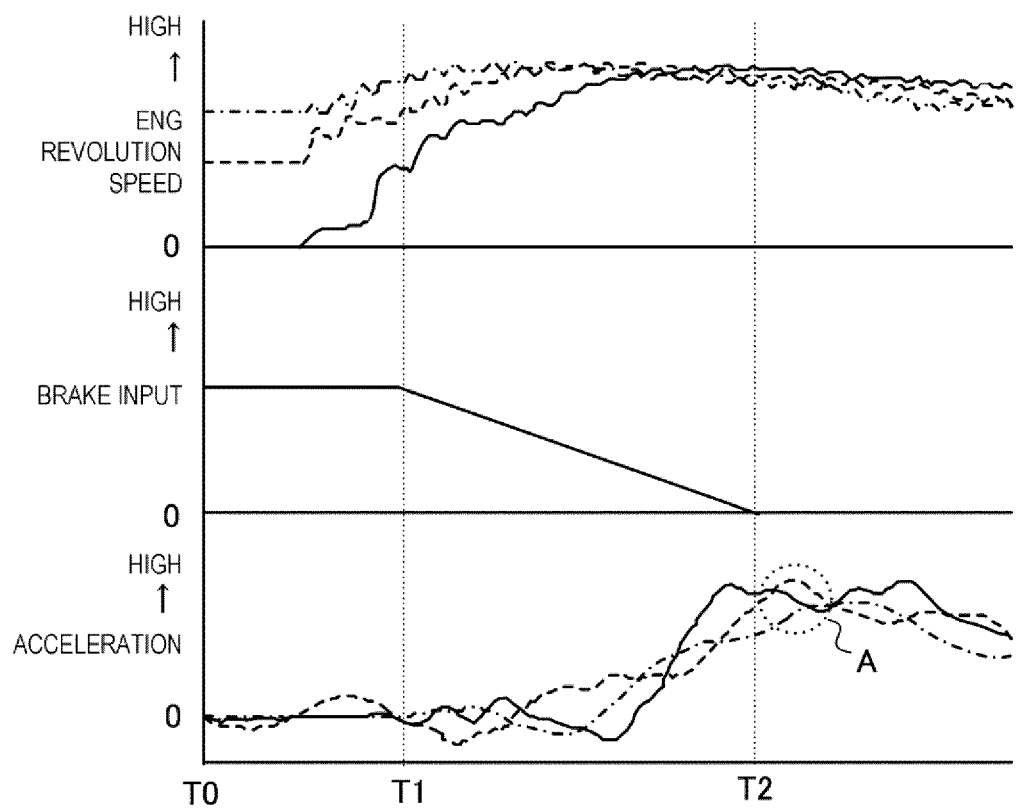
FIG. 2 is a timing chart in a case where an engine is automatically restarted from a state where the engine is automatically stopped.

This will be described with reference to FIG. 2. FIG. 2 is a timing chart of the engine revolution speed, a brake input, and the acceleration when the engine 2 is automatically restarted from a state where the engine 2 is automatically stopped. In the chart, the restart condition is satisfied at a timing T0, and then the engine 2 is automatically restarted with a predetermined delay time.

When the revolution of the engine 2 is stopped, the revolution speed in determination is zero [rpm]. However, when the intention of the driver changes and the brake pedal is released immediately after fuel cut is executed and the vehicle is stopped as the automatic stop condition is satisfied, the engine revolution speed may not decrease to zero at the time when the restart condition is satisfied. In FIG. 2, a case in which the revolution speed in determination is zero is indicated by a solid line, a case of a first revolution speed that is higher than zero is indicated by a broken line, and a case of a second revolution speed that is higher than the first revolution speed is indicated by a dashed line.

A time during which the brake holding control is continued, that is, a time during which the brake input is kept constant (timing T0 to timing T1) after the restart condition is satisfied is referred to as a holding time. A period until the brake input gradually decreases to zero (timing T1 to the timing T2) is referred to as a removal time. Then, in FIG. 2, the holding time and the removal time are the same at any revolution speed in determination.

After the removal time has elapsed (that is, after the timing T2), when the revolution speed in determination is the second revolution speed, the acceleration is equal to or smaller than that in the case in which the revolution speed in determination is zero [rpm] (hereinafter, this is also referred to as a normal time). On the other hand, when the revolution speed in determination is the first revolution speed, the acceleration is greater than that in the normal time in a region A in FIG. 2. That is, when the revolution speed in determination is the first revolution speed, the kicked feeling is stronger than that in the normal time. In addition, an appropriate holding time varies depending on whether a road where the vehicle is stopped is a flat road. Therefore, in the present embodiment, control described below is executed in order to set a holding time for enabling quick start while suppressing the kicked feeling.

Figure 3:
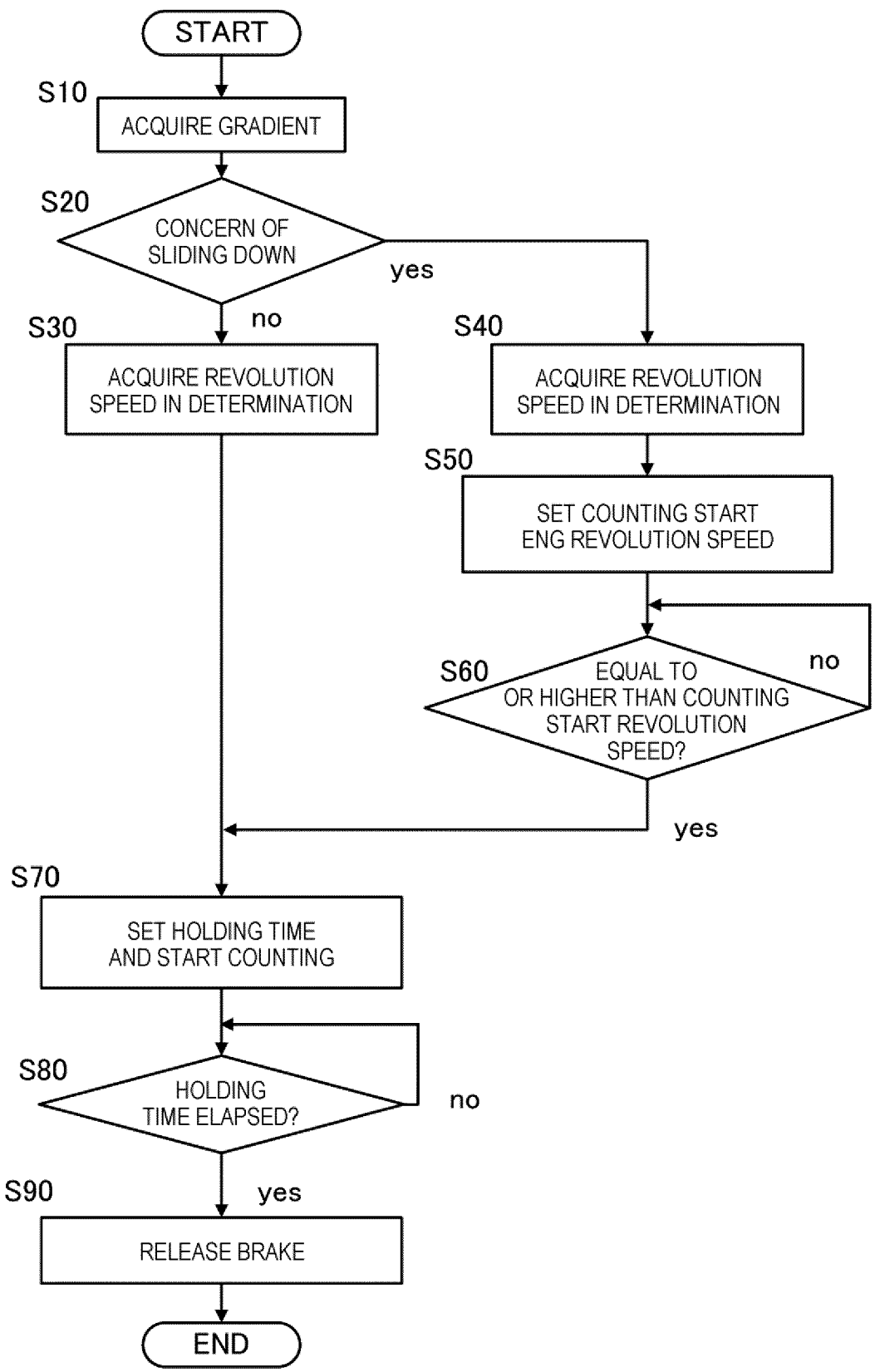
FIG. 3 is a flowchart of control executed by a controller at a time of automatic restart according to an embodiment of the invention.

FIG. 3 is a flowchart of control executed by the controller 10 when the restart condition is satisfied in a state where the engine 2 is automatically stopped and the brake system 3 is executing the brake holding control.

In step S10, the controller 10 acquires the gradient of the road surface on which the vehicle is stopped based on the detection value of the gradient sensor 7. The gradient can also be acquired from position information acquired by a navigation system (not illustrated) and map data stored in advance.

In step S20, the controller 10 determines whether there is a concern of the sliding down based on the gradient acquired in step S10, executes processing in step S30 if there is no concern of the sliding down, and executes processing in step S40 if there is the concern of the sliding down. Specifically, it is determined that there is a concern when the gradient is equal to or greater than a preset threshold value, and there is no concern when the gradient is smaller than the threshold value. The threshold value used here varies depending on a vehicle weight of the vehicle 1 or the like, and is set by simulation or the like for each specification of the vehicle 1.

The controller 10 acquires the revolution speed in determination based on the detection value of the crank angle sensor 8 in step S30, and then executes processing in step S70 described later.

In step S40, the controller 10 acquires the revolution speed in determination in the same manner as in step S30.

In step S50, the controller 10 sets a counting start revolution speed based on the revolution speed in determination. The counting start revolution speed is an engine revolution speed at which counting of a timer for counting the holding time is started. In addition, the counting start revolution speed is an engine revolution speed at which a driving force that can prevent the vehicle 1 from sliding down can be generated, and is a higher value as the gradient increases.

In step S60, the controller 10 determines whether an actual engine revolution speed is equal to or higher than the counting start revolution speed, and executes the processing in step S70 when the actual engine revolution speed is equal to or higher than the counting start revolution speed.

In step S70, the controller 10 sets the holding time, and starts the counting of the timer for counting the holding time. Here, the holding time is set to be shorter as the revolution speed in determination increases.

The controller 10 repeatedly determines whether the holding time has elapsed in step S80 until the holding time elapses, and when the holding time has elapsed, the controller 10 decreases the braking force of the brake system 3 in step S90, and ends a routine of the present control.

A brake system controller for controlling the brake system 3 may be provided separately from the controller 10. In this case, after performing the processing in steps S10 to S80, the controller 10 transmits a brake release request to the brake system controller in step S90.

Figure 4:
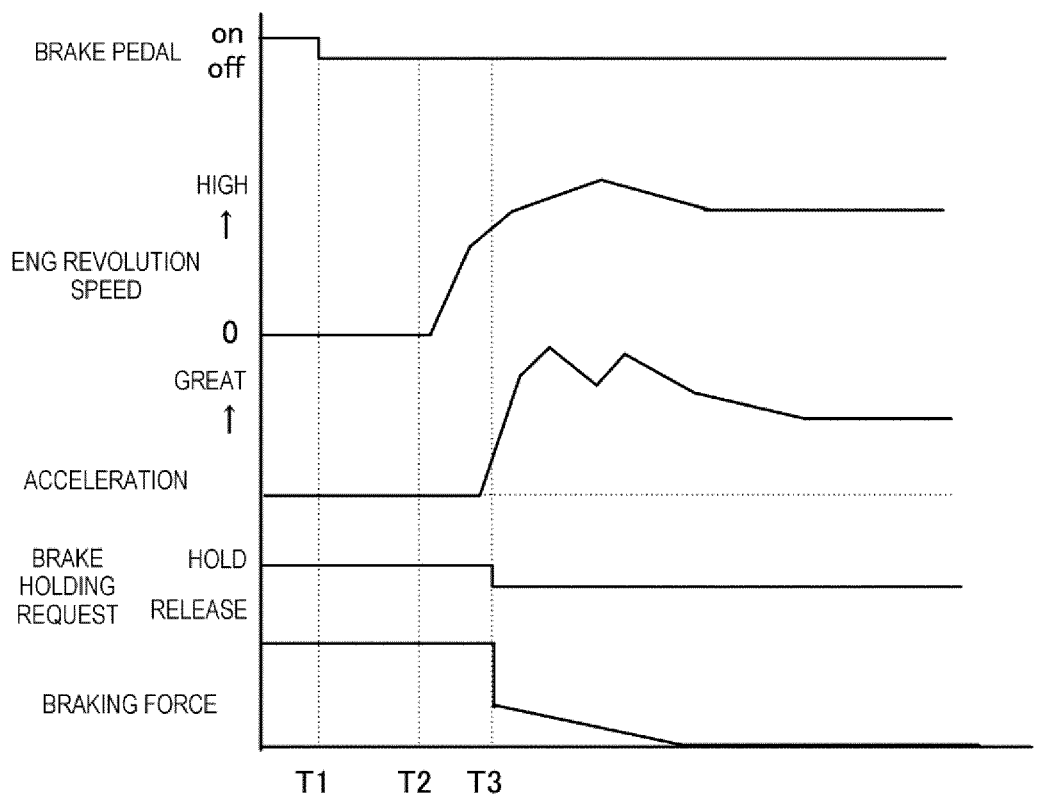
FIG. 4 is a first example of a timing chart when the control in FIG. 3 is executed.
Figure 5:
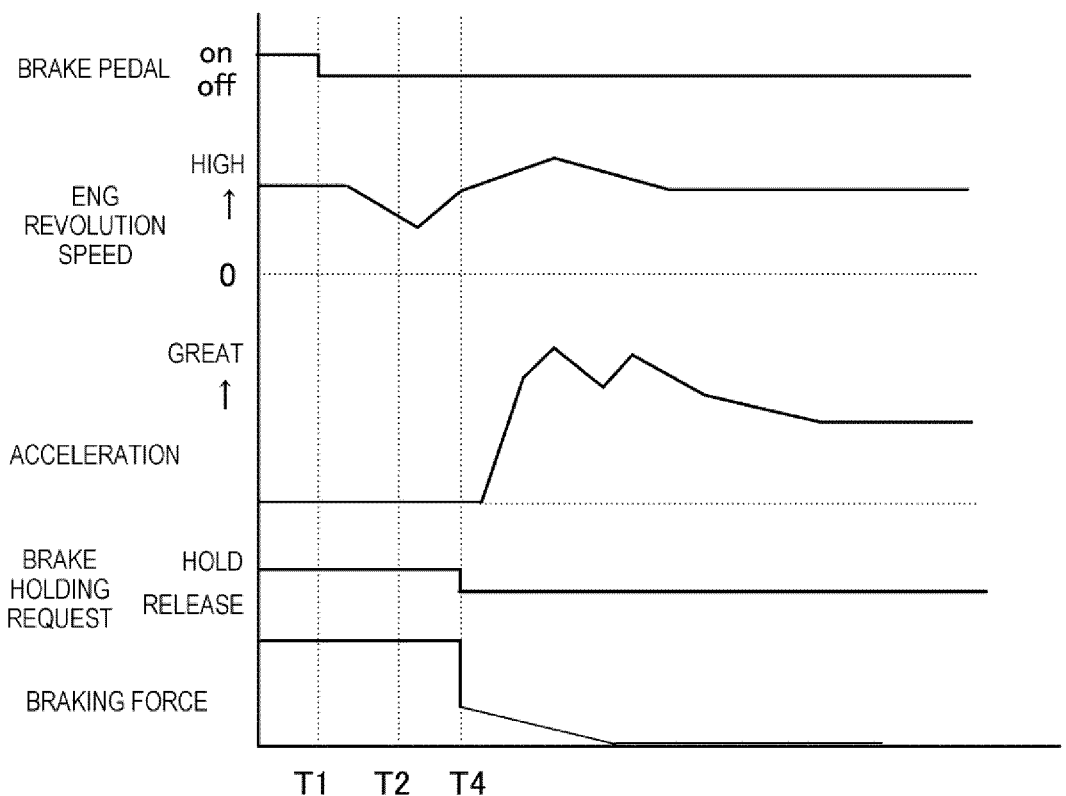
FIG. 5 is a second example of a timing chart when the control in FIG. 3 is executed.
Figure 6:
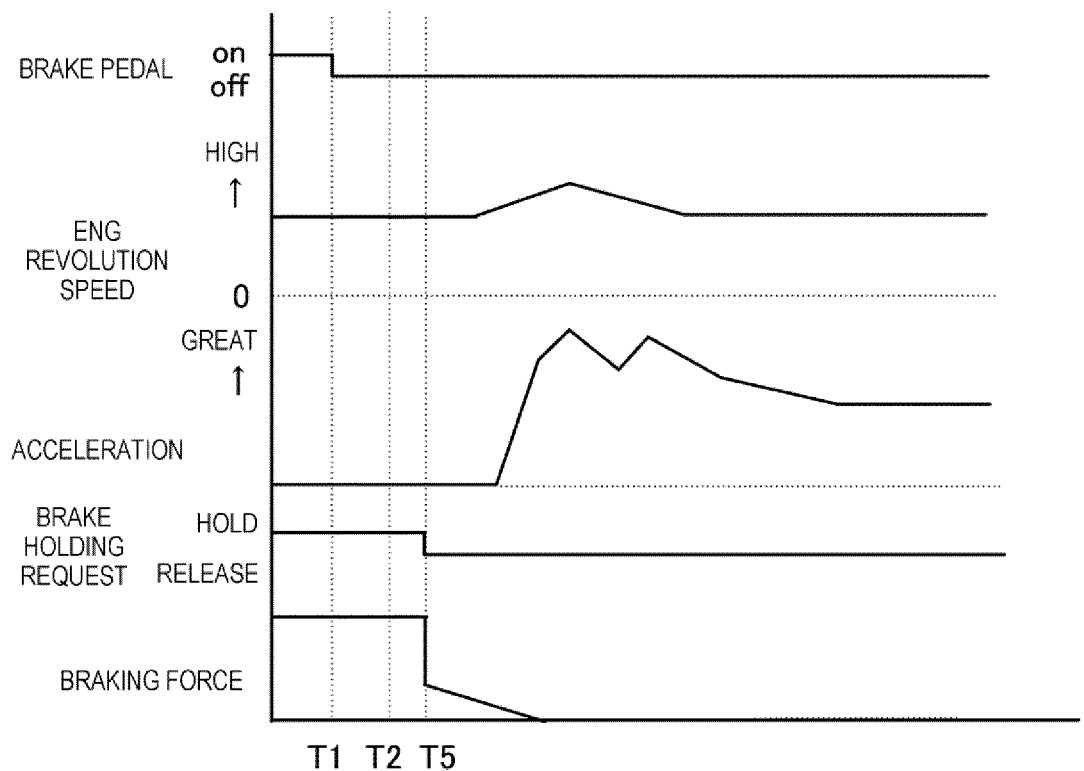
FIG. 6 is a third example of a timing chart when the control in FIG. 3 is executed.

FIGS. 4 to 6 are timing charts when the above control is executed in a state where the vehicle is stopped on the flat road. FIG. 4 illustrates the case in which the revolution speed in determination is zero [rpm] (that is, in the normal time), FIG. 5 illustrates a case in which the revolution speed in determination is the first revolution speed, and FIG. 6 illustrates a case in which the revolution speed in determination is the second revolution speed. Zero<the first revolution speed<the second revolution speed.

In any of FIGS. 4 to 6, the brake pedal is released at the timing T1, the restart condition is satisfied at the timing T2, and then a start operation of the engine 2 is disclosed. A period from the timing T1 to the timing T2 is the delay time in the control. Similarly, there is also a delay time from when the restart condition is satisfied to when the start operation of the engine 2 is actually started.

In the normal time illustrated in FIG. 4, the revolution speed in determination is zero [rpm], the brake holding control is ended at a timing T3 at which a predetermined holding time has elapsed after the restart condition is satisfied, and the braking force starts to decrease.

In the case in which the revolution speed in determination is the first revolution speed that is higher than zero illustrated in FIG. 5, a holding time shorter than that in the normal time is set, and the brake holding control is ended at a timing T4 earlier than the timing T3.

In the case in which the revolution speed in determination is the second revolution speed that is higher than the first revolution speed illustrated in FIG. 6, a shorter holding time is set, and the brake holding control is ended at a timing T5 earlier than the timing T4.

As described above, by shortening the holding time of the brake holding control as the revolution speed in determination increases, it is possible to make an acceleration profile substantially the same as that in the normal time even in the case in which the revolution speed in determination is the first revolution speed or the second revolution speed. In other words, by setting the holding time in accordance with the revolution speed in determination, the kicked feeling can be suppressed to a level in the normal time.

Figure 7:
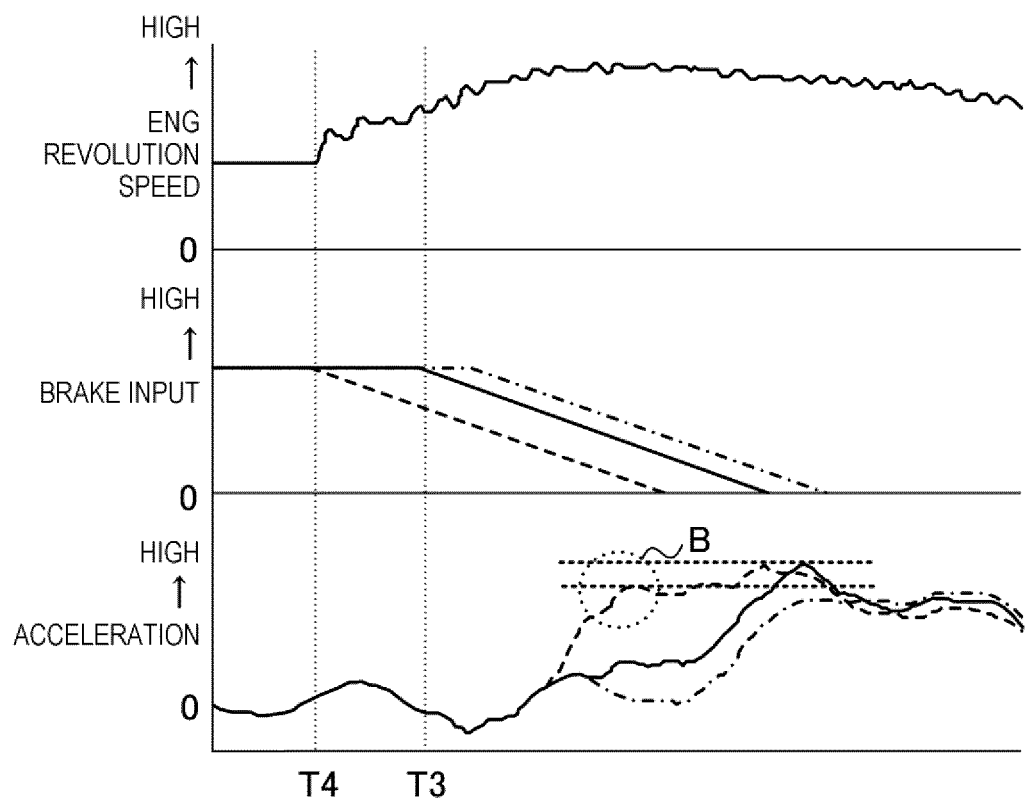
FIG. 7 is a timing chart in a case where a revolution speed in determination is fixed to a first revolution speed and a holding time is varied.

FIG. 7 is a timing chart in the case in which the revolution speed in determination is fixed to the first revolution speed and the holding time is varied. In FIG. 7, a solid line indicates a case of the same holding time as that in the normal time, a broken line indicates a case in which the holding time is shorter than that in the normal time, and a dashed line indicates a case in which the holding time is longer than that in the normal time.

In the case in which the holding time is shorter than that in the normal time, a timing of reaching a first peak of the acceleration is earlier and the first peak is lower than in the case of the holding time in the normal time (see a region B in FIG. 7). That is, by shortening the holding time than that in the normal time, it is possible to quickly start the vehicle than in the case in which the holding time is the same as that in the normal time, and to suppress particularly the abruptness feeling among the kicked feeling.

Even in the case in which the holding time is set to be longer than that in the normal time, the first peak of the acceleration is lower than in the case in which the holding time is the same as that in the normal time, and thus it is possible to suppress the kicked feeling. However, since a rising timing of the acceleration is slower than that in the normal time, quick start cannot be achieved.

Figure 8:
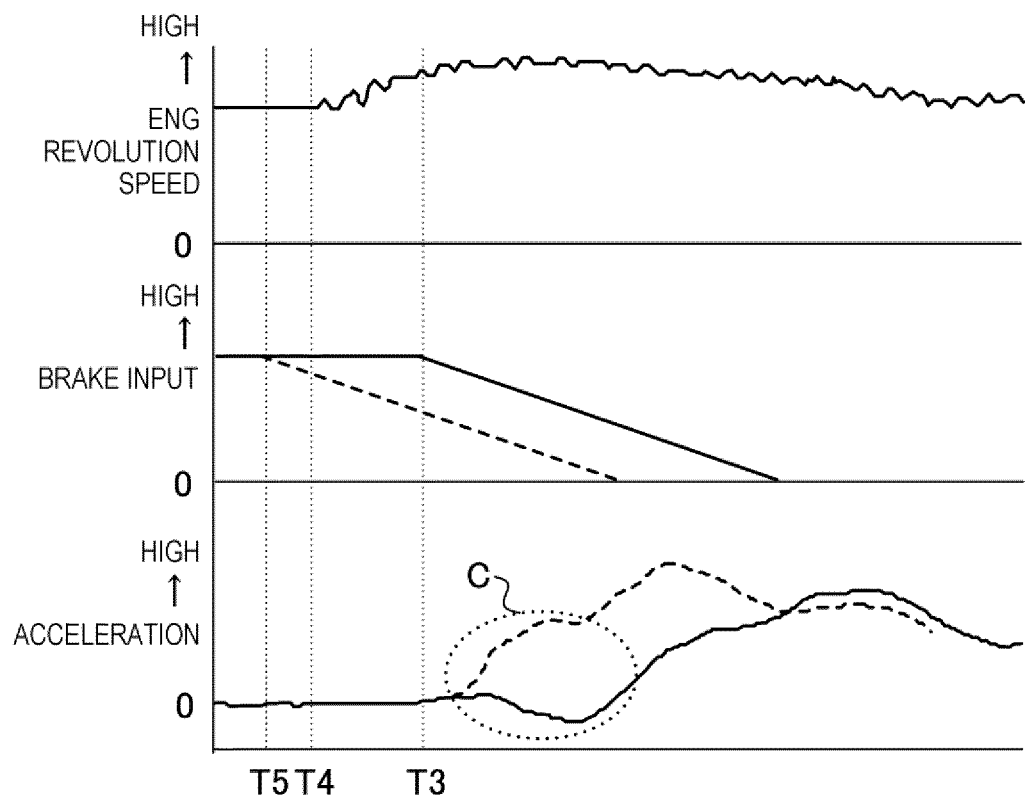
FIG. 8 is a timing chart in a case where a revolution speed in determination is fixed to a second revolution speed and a holding time is varied.

FIG. 8 is a timing chart in the case in which the revolution speed in determination is fixed to the second revolution speed and the holding time is varied. In FIG. 8, a solid line indicates the case of the same holding time as that in the normal time, and the broken line indicates the case in which the holding time is shorter than that in the normal time. The timing T5 at which the holding time ends is earlier than the timing T4 at which the holding time ends in the case in which the revolution speed in determination is the first revolution speed.

By shortening the holding time, a time required for the acceleration to rise after the engine 2 is automatically restarted is short (see a region C in FIG. 8). That is, quick start is enabled.

As described above, the present embodiment provides the vehicle 1 including the internal combustion engine 2 as the driving source, in which the controller 10 executes the automatic stop control of automatically stopping the internal combustion engine 2 when a predetermined stop condition is satisfied and executes the automatic restart control of automatically restarting the internal combustion engine 2 when a predetermined restart condition is satisfied during the execution of the automatic stop control. During the execution of the automatic stop control, the controller 10 performs the brake holding control of applying the braking force to the wheels 9 to maintain the vehicle stop state. In addition, when the restart condition is satisfied, the internal combustion engine 2 is automatically restarted, and the brake holding control is released when a predetermined period elapses after the restart condition is satisfied. The controller 10 varies the predetermined period according to the engine revolution speed (the revolution speed in determination) at the time when the restart condition is satisfied. More specifically, the controller 10 sets the predetermined period to be shorter as the engine revolution speed at the time when the restart condition is satisfied increases. Although a generated driving force profile after the engine 2 is automatically restarted varies depending on the revolution speed in determination, according to the present embodiment, it is possible to set the holding time in accordance with the generated driving force profile, and thus it is possible to quickly start without giving the driver the kicked feeling.

In the present embodiment, the controller 10 varies the predetermined period (the holding time) according to the gradient of the road surface where the vehicle 1 is stopped, in addition to the engine revolution speed at the time when the restart condition is satisfied. Since the gradient affects the generated driving force profile in the same manner as the revolution speed in determination, it is possible to suppress the kicked feeling and the like by changing the holding time according to the gradient.

In the present embodiment, when the gradient of the road surface is equal to or greater than the threshold value determined according to the specification of the vehicle 1, the controller 10 continues the brake holding control until at least a predetermined engine revolution speed is reached. At the time of automatic restart on the uphill road, there is a concern that the vehicle 1 will slide down, but according to the present embodiment, it is possible to prevent the vehicle 1 from sliding down. The predetermined engine revolution speed is an engine revolution speed at which a driving force capable of preventing the vehicle 1 from sliding down can be generated.

In the present embodiment, the controller 10 varies the predetermined engine revolution speed according to the engine revolution speed (the revolution speed in determination) at the time when the restart condition is satisfied. That is, a timing at which the brake holding control is released is set according to the generated driving force profile after the automatic restart that varies depending on the revolution speed in determination. Accordingly, it is possible to suppress the kicked feeling after the automatic restart and to prevent the vehicle 1 from sliding down.

It is needless to say that the invention is not limited to the above embodiment, and various modifications can be made within the scope of the technical idea described in the claims.

What is claimed is:

1. A control method for a vehicle including an internal combustion engine as a driving source, the control method for the vehicle comprising:
   executing automatic stop control of automatically stopping the internal combustion engine when a predetermined stop condition is satisfied, and executing automatic restart control of automatically restarting the internal combustion engine when a predetermined restart condition is satisfied during execution of the automatic stop control;
   performing a brake holding control of applying a braking force to wheels to maintain a vehicle stop state during the execution of the automatic stop control; and
   automatically restarting the internal combustion engine when the predetermined restart condition is satisfied, and releasing the brake holding control when a predetermined period elapses since the predetermined restart condition is satisfied, wherein:
   the predetermined period is varied according to an engine revolution speed at a time when the predetermined restart condition is satisfied.

2. The control method for a vehicle according to claim 1, wherein:
   the predetermined period is set to be shorter as the engine revolution speed at the time when the predetermined restart condition is satisfied increases.

3. The control method for a vehicle according to claim 1, wherein:
   the predetermined period is also varied according to a gradient of a road surface where the vehicle is stopped in addition to the engine revolution speed at the time when the predetermined restart condition is satisfied.

4. The control method for a vehicle according to claim 3, wherein:
   when the gradient of the road surface is equal to or greater than a threshold value determined according to a specification of the vehicle, the brake holding control is continued until at least a predetermined engine revolution speed is reached.

5. The control method for a vehicle according to claim 4, wherein:
   the predetermined engine revolution speed is varied according to the engine revolution speed at the time when the predetermined restart condition is satisfied.

6. A vehicle comprising:
   an internal combustion engine as a driving source;
   a brake system configured to apply a braking force to wheels; and
   a controller configured to:
     control the internal combustion engine and the brake system,
     execute automatic stop control of automatically stopping the internal combustion engine when a predetermined stop condition is satisfied,
     execute automatic restart control of automatically restarting the internal combustion engine when a predetermined restart condition is satisfied during execution of the automatic stop control,
     perform a brake holding control of applying a braking force to the wheels to maintain a vehicle stop state during the execution of the automatic stop control,
     automatically restart the internal combustion engine when the predetermined restart condition is satisfied,
     release the brake holding control when a predetermined period elapses since the predetermined restart condition is satisfied, and
     vary the predetermined period according to an engine revolution speed at a time when the restart condition is satisfied.

* * * * *